(12) United States Patent
Javidi et al.

(10) Patent No.: US 7,050,635 B2
(45) Date of Patent: May 23, 2006

(54) MULTI-DIMENSIONAL PATTERN RECOGNITION BY USE OF DIGITAL HOLOGRAPHY

(75) Inventors: Bahram Javidi, Storrs, CT (US); Enrique Tajahuerce, Castellon (ES)

(73) Assignee: The University of Connecticut, Storrs, CT (US)

( * ) Notice: Subject to any disclaimer, the term of this patent is extended or adjusted under 35 U.S.C. 154(b) by 762 days.

(21) Appl. No.: 09/822,805

(22) Filed: Mar. 30, 2001

(65) Prior Publication Data

US 2002/0181781 A1    Dec. 5, 2002

(51) Int. Cl.
*G06K 9/76* (2006.01)
(52) U.S. Cl. .................... 382/210; 382/154; 359/558
(58) Field of Classification Search ........ 382/181–231, 382/154, 285; 359/558–564, 1–35, 462–477; 345/419–427; 356/12–14; 348/42–60; 352/57–65; 33/20.4; 353/7–9; 378/41–42
See application file for complete search history.

(56) References Cited

U.S. PATENT DOCUMENTS

| | | | | |
|---|---|---|---|---|
| 4,053,228 A * | 10/1977 | Schiller | ................... | 356/71 |
| 4,832,447 A | 5/1989 | Javidi | ................... | 350/162.13 |
| 4,900,128 A * | 2/1990 | Lom | ................... | 359/11 |
| 5,119,443 A | 6/1992 | Javidi et al. | ................... | 382/42 |
| 5,339,305 A * | 8/1994 | Curtis et al. | ................... | 369/103 |
| 5,367,579 A | 11/1994 | Javidi et al. | ................... | 382/31 |
| 5,485,312 A | 1/1996 | Horner et al. | ................... | 359/561 |
| 5,497,433 A * | 3/1996 | Itoh et al. | ................... | 382/211 |
| 5,619,596 A * | 4/1997 | Iwaki et al. | ................... | 382/278 |
| 5,699,449 A | 12/1997 | Javidi | ................... | 382/156 |
| 5,754,691 A * | 5/1998 | Hong | ................... | 382/210 |
| 5,841,907 A | 11/1998 | Javidi et al. | ................... | 382/210 |
| 5,875,108 A * | 2/1999 | Hoffberg et al. | ................... | 700/17 |
| 6,002,499 A * | 12/1999 | Corboline et al. | ................... | 359/2 |
| 6,263,104 B1 * | 7/2001 | McGrew | ................... | 382/210 |
| 6,366,698 B1 * | 4/2002 | Yamakita | ................... | 382/187 |

OTHER PUBLICATIONS

B. Javidi, "Optical Neural Networs", Encyclopedia of Electrical and Electronic Engineering, Volume on Neural Networks, John Wiley, 1998 (pp. 309-327).

B. Javidi, "Optical Information Processing", Encyclopedia of Electrical and Electronic Engineering, Volume on Optics, John Wiley, 1999, (pp. 470-481).

J.H. Bruning, D.R. Herriott, J.E. Gallagher, D.P. Rosenfeld, A.D. White, D.J. Brangaccio, Applied Optics, "Digital Wavefront Measuring Interferometer for Testing Optical Surfaces and Lenses" vol. 13, No. 11, Nov. 1974, (pp. 2693-2703).

(Continued)

*Primary Examiner*—Bhavesh M. Mehta
*Assistant Examiner*—Aaron Carter
(74) *Attorney, Agent, or Firm*—Cantor Colburn LLP (57) ABSTRACT

A method and system for performing three-dimensional pattern recognition by use of digital holography is disclosed. The complex amplitude distribution generated by an object is recorded by phase-shifting interferometry. The digital hologram contains information about the objects shape, location, and orientation. This information allows one to perform multi-dimensional pattern-recognition methods with a high degree of discrimination and to measure three-dimensional orientation changes.

68 Claims, 10 Drawing Sheets

OTHER PUBLICATIONS

J.L. Horner and P.D. Gianino, Applied Optics "Phase-Only Matched Filtering", vol. 23, No. 6, Mar. 15, 1984 (pp. 812-816).

H. Arimoto, K. Yoshimori, K. Itoh, Optics Communications "Passive Interferometric 3-D Imaging and Incoherence Gating", vol. 170, Nov. 1999, (pp. 319-329).

I. Yamaguchi, T. Zhang, Optics Letters, "Phase-Shifting Digital Holography", vol. 22 No. 16 Aug. 1997, (pp. 1268-1270).

J. Rosen, Optics Letters, "Three-Dimensional Optical Fourier Transform and Correlation" vol. 22, No. 13, Jul. 1997, (pp. 964-966).

A.Pu, R. Denkewalter, D. Psaltis, Optical Engineering "Real-Time Vehicle Navigation Usinga Holographic Memory" vol. 36, No. 10, Oct. 1997, (pp. 2737-2746).

J.J. Esteve-Taboada, D. Mas, J. Garcia Applied Optics, Three-Dimensional Object Recognition by Fourier Transform Profilometry, vol. 38, No. 22, Aug. 1999, (pp. 4760-4765).

A. Vanderlugt, IEEE Transactions on Information Theory "Signal Detection by Complex Spatial Filtering", vol. 1T-10, No. 2, Apr. 1964, (pp. 139-145).

D. Psaltis, E. Paek, S. Venkatesh, Optical Engineering, "Optical Image Correlation With a Binary Spatial Light Modulator", vol. 23, No. 6, Nov.-Dec. 1984, (pp. 698-704).

Ph. Refregier, Optics Letters, "Filter Design for Optical Pattern Recognition: Multicriteria Optimization Approach" vol. 15, No. 15, Aug. 1990, (pp. 854-856).

B, Javidi, E. Tajahuerce, Proceddings of SPIE,"Three-Dimensional Image Processing and Recognition", vol. 4043, No. 26-27, Apr. 2000, (pp. 2-10).

B. Javidi, Real-Time Optical Information Processing, "Nonlinear Joint Transform Correlators"Chapter 4, Academic Press, 1994, (pp. 116-183).

J.W. Goodman, Introduction to Fourier Optics, Chapter 9, "Holography", McGraw-Hill, New York,996, (pp. 295-341).

John B. Develis, George O. Reynolds, Handbook on Optical Holography, "Fresnel Holography", 1979 by Acedemic Press, Chapter 4.1 (pp. 139-155).

Brian J. Thompson, Handbook on Optical Holography, "Fraunhofer Holograms", 1979 by Academic Press, Chapter 4.2 (pp. 157-163).

Henri H. Arsenault, Gilbert April, Handbook on Optical Holography"Fourier Holography", 1979 by Academic Press, Chapter 4.3, (pp. 165-180).

David Casasent, Handbook on Optical Holography, "Pattern and Recognition", 1979 by Academic Press, Chapter 10.5, (pp. 503-536).

\* cited by examiner

MULTI-DIMENSIONAL PATTERN RECOGNITION BY USE OF DIGITAL HOLOGRAPHY

TECHNICAL FIELD

This invention relates multi-dimensional object, pattern or data recognition by use of digital holography.

BACKGROUND OF THE INVENTION

Optical correlation methods have proved to be very useful in the design of two-dimensional (2D) pattern-recognition applications (A. VanderLugt, IEEE Trans. Inf. Theory IT-10, 139 (1964); J. L. Homer and P. D. Gianino, Appl. Opt. 23, 812 (1984); D. Psaltis, E. G. Paek, and S. S. Venkatesh, Opt. Eng. 23, 698 (1984); Ph. Refrefgier, Opt. Lett. 15, 854 (1990) and J. W. Goodman, *Introduction to Fourier Optics* (McGraw-Hill, New York, 1996) which are incorporated herein by reference in their entirety).

Recently, there has been increasing interest in three-dimensional (3D) optical information processing because of its vast potential applications. Several methods have been proposed to extend optical correlation methods to three-dimensional object recognition. One approach consists of processing different 2D projections of both a three-dimensional scene and a three-dimensional reference object by use of conventional 2D Fourier methods (A. Pu, R. Denkewalter, and D. Psaltis, Opt. Eng. 36, 2737 (1997) which is incorporated herein by reference in its entirety).

Other methods also involve the acquisition of different 2D perspectives, but the recognition is performed by three-dimensional Fourier-transform methods (J. Rosen, Opt. Lett. 22, 964 (1997) which is incorporated herein by reference in its entirety). This approach has analogies to incoherent-light three-dimensional imaging based on spatial coherent functions (H. Arimoto, K. Yoshimori, and K. Itoh, Opt. Commun. 170, 319 (1999) which is incorporated herein by reference in its entirety). Fourier-transform profilometry has also been applied to three-dimensional shape recognition (J. J. Esteve-Taboada, D. Mas, and J. Garcia, Appl. Opt. 22, 4760 (1999) which is incorporated herein by reference in its entirety).

However, holography, seems to be a more attractive method of performing three-dimensional image recognition, since a single hologram is able to record three-dimensional information on the object, avoiding sequential recording of several 2D perspectives and maintaining the phase (H. J. Caulfield, ed., *Handbook of Optical Holography* (Academic, London, 1979) which is incorporated herein by reference in its entirety).

SUMMARY OF THE INVENTION

A method and system for recognizing multi-dimensional objects, patterns or sets of data utilizing digital holography is disclosed. The method comprises generating a hologram of a reference object; generating a hologram of an input object; and correlating the hologram of the reference object with the hologram of the input object generating thereby a set of correlation peaks. The presence of a correlation peak indicates similarity between the reference object and the input object and the lack of the presence of a correlation peak indicates dissimilarity between the reference object and the input object. The method may be used to determine a change in a kinematic property of an object.

A storage medium is disclosed that is encoded with a set of data created by generating a hologram of a reference object, generating a hologram of an input object, and correlating the hologram of the reference object with the hologram of the input object generating thereby a set of correlation peaks.

The system for performing pattern recognition comprises a light source for generating an optical beam; means for dividing the optical beam into a reference beam and an object beam; means for introducing a phase shift between the reference beam and the object beam; an object positioned within the object beam; a beam combiner for combining the reference beam and the object beam; and a detector for detecting the combination of the reference beam and the object beam.

DESCRIPTION OF THE PREFERRED EMBODIMENTS

Figure 1:
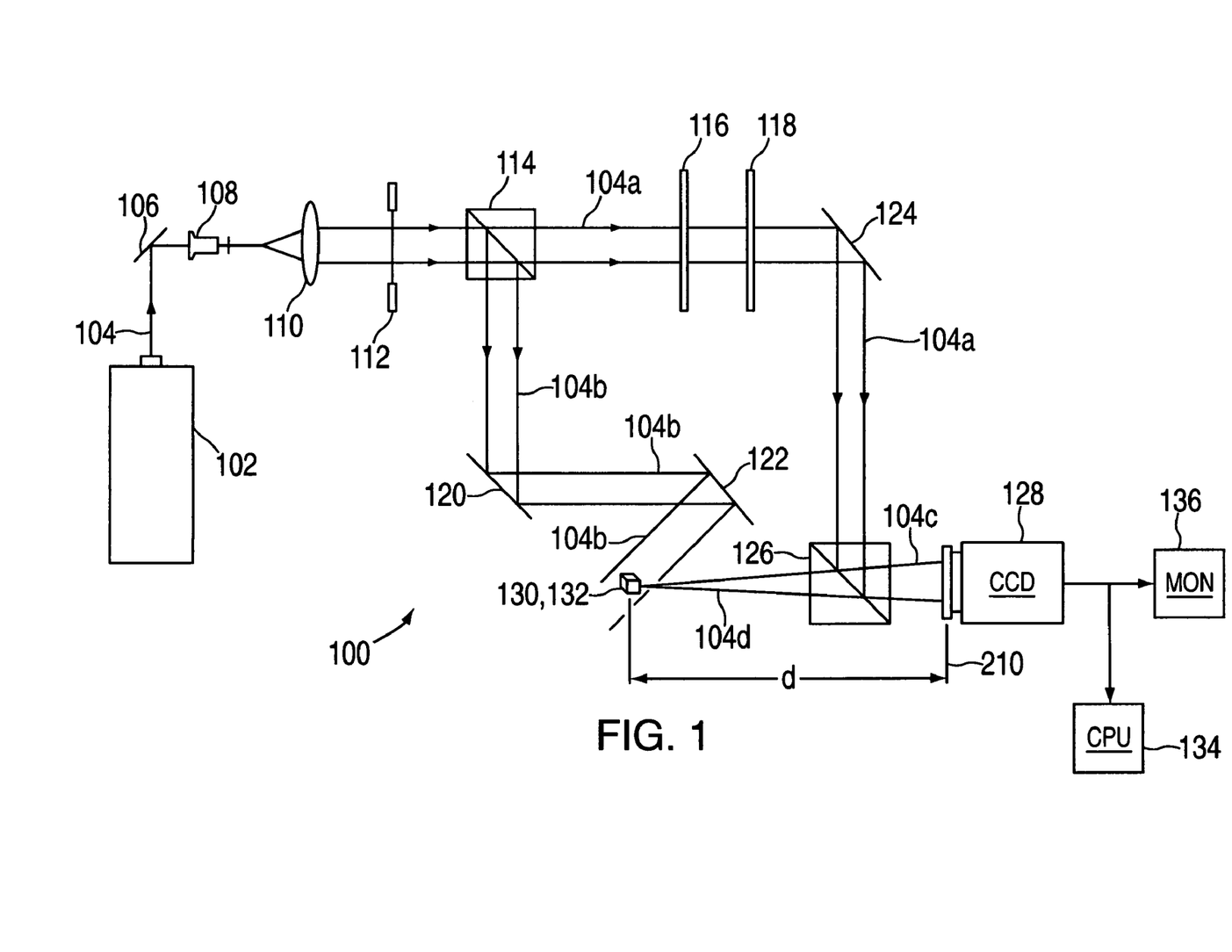
FIG. 1 is a schematic representation of a phase-shifting interferometer for recording an inline digital hologram of a three dimensional object.

An optical system for the digital holographic recording of a three-dimensional object, a pattern or a set of data is based on an interferometer, such as a Mach-Zehnder interferometer 100, and is depicted in FIG. 1. Polarized light 104 emanating from a laser 102, such as an Argon laser, a helium-neon laser an infrared laser or other such laser, is divided into an object beam 104b and a reference beam 104a. The object beam 104b illuminates a still or moving three-dimensional reference object 130, while the reference beam 104a forms an in-line interference pattern together with the light 104d diffracted by the reference object 130. The reference object 130 may comprise, for example, an optical image, a digitized image, a computer generated image, a one-dimensional or multi-dimensional object, pattern or set of data, an electrical signal or an optical signal. The object 130 may also include two or three-dimensional phase objects or color objects and is shown as a three-dimensional object by way of exemplification.

The interference pattern, or hologram, is formed or recorded on a detector or storage medium 128, such as a CCD camera. In FIG. 1, the reference numeral 108 denotes a spatial filter, 110 denotes a lens, 112 is a diaphragm, 114 and 126 are beam splitters, 106, 120, 122, 124, are plane mirrors, 116 and 118 are phase retarders with retardation of $\lambda/2$ and $\lambda/4$ respectively, where $\lambda$ is the wavelength of the light emanating from the laser 102. The reference object 130 is located at a distance d from a recording plane 210 in the CCD camera 128. The CCD camera 128 is in turn in signal communication with a monitor 136 and a computer 134.

Consider the opaque three-dimensional reference object 130, as a complex amplitude distribution $U_O(x, y, z)$, where x, y are the transverse coordinates and z denotes the paraxial distance from the reference object 130 to the output plane 210 of the CCD camera 128. In the Fresnel approximation, neglecting secondary diffraction, the complex amplitude distribution, $H_O(x, y,)$, due to the object beam 104d and recorded in the output plane 210 can be evaluated from the following superposition integral:

$$H_O(x, y) = A_H(x, y)\exp[i\phi_H(x, y)] \quad (1)$$
$$= \frac{1}{i\lambda}\int\int\int_\infty^\infty U_O(x', y'; z)\frac{1}{z}\exp\left(i2\frac{\pi}{\lambda}z\right) \times$$
$$\exp\left[i\frac{\pi}{\lambda z}[(x-x')^2 + (y-y')^2]\right]dx'dy'dz$$

The complex field generated by the reference beam 104a at the output plane 210 can be written as $R(x, y; \alpha_n)=A_R\exp[i(\phi+\alpha_n)]$, where $\phi$ is the constant phase when both fast axes of the phase retarders 116, 118 are aligned with the direction of polarization and $\alpha_n$ is the phase shift in other configurations of the phase retarders 116, 118. As seen in FIG. 8, by adjusting the relative position of the slow and fast axes of the phase retarders 116, 118, phase shifts of $\alpha_n=0$, $\pi/2$, $\pi$, and $3\pi/2$ are produced without altering the constant amplitude, $A_R$, of the reference beam 104a. The phase retarders 116, 118 allow for the modulation or shifting of the phase, $\alpha_n$, of the reference beam 104a with respect to the object beam 104b. In this manner, phase shifts, $\alpha_n$, are introduced into the reference beam 104a with respect to the object beam 104b by the relative positioning of the fast and slow axes of the retarder plates 116, 118 with the polarization of the incident light 104a. The aforesaid phase shifts, $\alpha_n$, may also be introduced into the reference beam 104a with respect to the object beam 104b by other methods or apparatus, such as the use of a liquid crystal chip in place of the phase retarders 116, 118 or by the movement of mirror 124.

The complex amplitude given by Eq. (1) is measured by recording four interferometric patterns, or holograms, $I_n(x, y; \alpha_n)=|H_O(x, y)+R(x, y; \alpha_n)|^2$.

The holograms, $I_n(x, y; \alpha_n)$, formed by the combination of $H_O(x, y)$ and $R(x, y; \alpha_n)$ are recorded digitally, or on film, as a hologram at the output plane 210. Such recording may be in the form, for example, of tangible storage media, such as optical storage materials (e.g., photorefractive materials), or digitally on floppy diskettes, CD-ROMs, hard drives, optically or electrically addressable spatial light modulators, charge coupled devices or any other computer-readable storage medium or processing unit addressable across a distributed environment such as a computer network system. It will be recognized that the holograms formed at the output plane 210 are not limited to the in-line holograms of FIG. 1, but may also be formed by off-axis holograms as is well known in the art.

The phase difference between the object beam 104b and the reference beam 104a is given by $$\phi_H(x, y) - \varphi = \arctan\left[\frac{I(x, y; -3\pi/2) - I(x, y; -\pi/2)}{I(x, y; 0) - I(x, y; -\pi)}\right] \quad (2)$$

The amplitude of the interference pattern of the object beam 104d and the reference beam 104a can be calculated from:

$$A_H(x, y)A_R = \frac{1}{4}I(x, y; 0) - \frac{I(x, y; -\pi)}{\cos[\phi_H(x, y) - \varphi]} \quad (3)$$

where the cosine function is obtained from Eq. (2). The parameters $\phi$ and $A_R$ are constant factors which can be replaced with 0 and 1, respectively.

Figure 2:
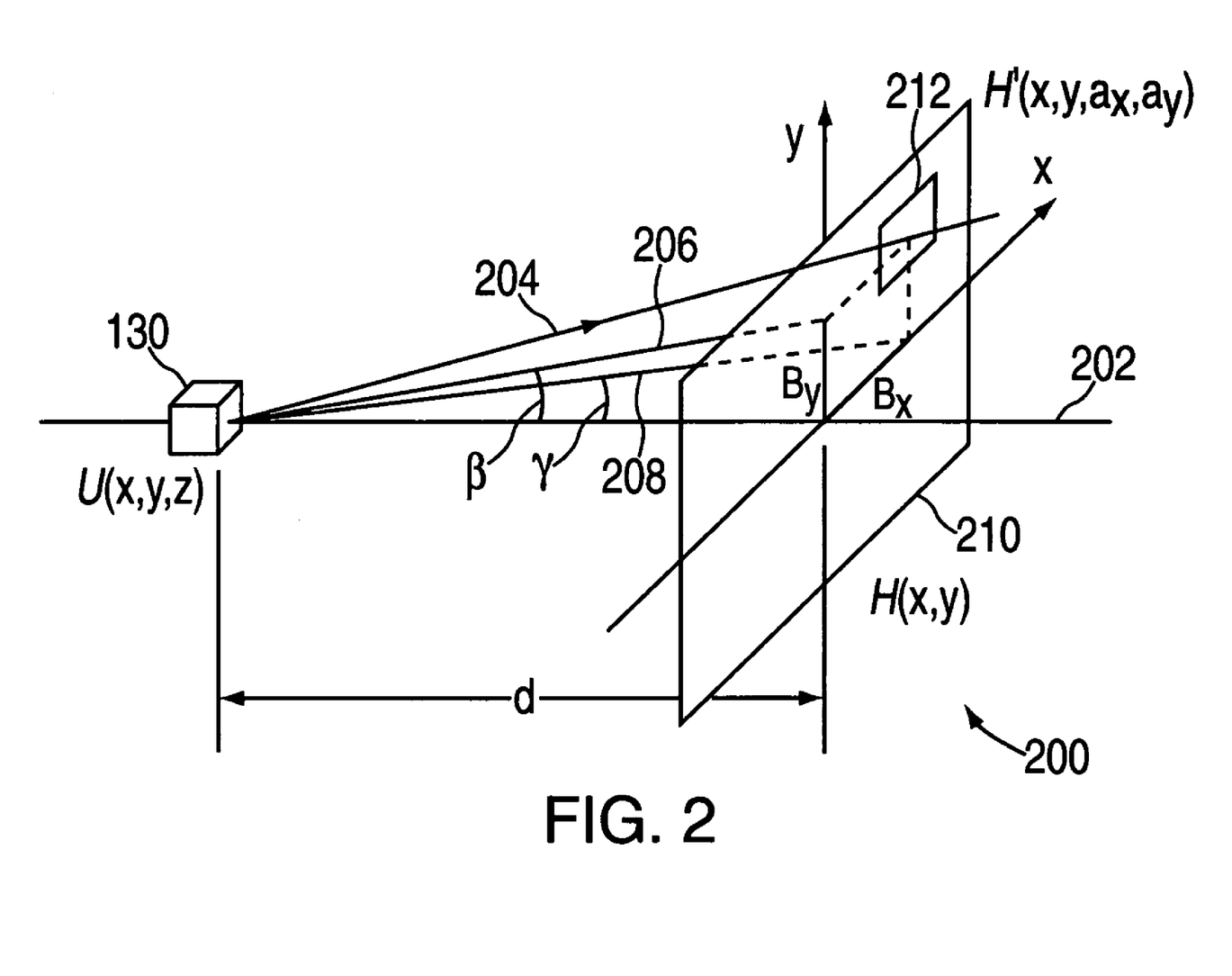
FIG. 2 is a schematic representation of the relationship between the displacement of a hologram window and the angle of view of the hologram.

Different regions or windows within the digital hologram of the reference object 130, record different perspectives, views or segments of the reference object 130. These different perspectives, views or segments of the reference object can be reconstructed by the numerical propagation of $H_O(x, y)$. The discrete complex amplitude distribution of the reconstructed reference object, $U_O'(m, n; a_x, a_y)$, at any plane in the object beam 104d, within the paraxial approximation and within the angle limitations imposed by the size of the CCD 128, can be numerically computed, aside from constant factors, by the discrete Fresnel transformation:

$$U_O'(m, n; a_x, a_y) = \quad (4)$$
$$\exp\left[\frac{i\pi}{\lambda d'}(\Delta x^2 m^2 + \Delta y^2 n^2)\right] \times \sum_{m'=0}^{N-1}\sum_{n'=0}^{N-1} H_O'(m', n'; a_x, a_y)$$
$$\exp\left[\frac{i\pi}{\lambda d'}(\Delta x'^2 m'^2 + \Delta y'^2 n'^2)\right]\exp\left[-i2\pi\left(\frac{mm!}{N_x} + \frac{nn!}{N_y}\right)\right]$$

where $d'=-d$; (m', n') are discrete spatial coordinates in the plane of the hologram 210; (m, n) correspond to discrete spatial coordinates in the plane of the reconstructed object and $N_x$ and $N_y$ are the number of samples in the x and y directions in the plane of the reconstructed object, respectively. The spatial resolution in the plane of the hologram 210 is ($\Delta x'$, $\Delta y'$), and the spatial resolution in the plane of the reconstructed object is ($\Delta x$, $\Delta y$). $H_O'(m, n, a_x, a_y)$ denotes the amplitude distribution of the object over a window 212 defined within the hologram 210 and used for the reconstruction of the reference object 130 (FIG. 2). $H_O'(m, n; a_x, a_y)$ is modified by a linear phase factor, $\exp[i2\pi(a_x m + a_y n)]$ to take into account the direction of observation. Thus, $$H_O'(m, n; a_x, a_y) = \tag{5}$$
$$H_O(m, n) rect\left(\frac{m-a_x}{b_x}, \frac{n-a_y}{b_y}\right) \times \exp[i2\pi(a_x m + a_y n)]$$

wherein rect(g, h) is the rectangle function. In Eqs. (4) and (5), $(a_x, a_y)$ are the pixel coordinates of the window 212 and $(b_x, b_y)$ denote the transverse size of the window 212. FIG. 2 shows the relationship between the displacement of the hologram window 212 and the angle of view along the direction of observation 204. Angles of γ and β are equal to $a_x \Delta x'/d$ and $a_y \Delta y'/d$, respectively. The minimum angle, $\gamma_{min}$, between different perspectives of the reference object 130 depends on the CCD pixel size, Δx', and the distance d, such that $\gamma_{min} = \Delta x'/d$. A similar relationship applies for the y direction for the angle β, i.e., $\beta_{min} = \Delta x'/d$. The maximum angle, $\gamma_{max}$, is a function of the CCD pixel size and the window size, such that $\gamma_{max} = (N_x - b_x)\Delta_x'/d$; and similarly for the angle β in the y direction, i.e., $\beta_{max} = (N_y - b_y)\Delta y'/d$. It will be appreciated that the resolution of the reconstructed images, Δx and Δy are also affected by the window size, i.e., $\Delta x = \lambda d/(b_x \Delta x')$ and $\Delta y = \lambda d/(b_y \Delta y')$. Equation (4) can be numerically evaluated with a fast Fourier-transform method. An alternative method of evaluating Eq. (4) is to use the propagation transfer function method:

$$U_O'(m, n; a_x, a_y) = \tag{6}$$
$$F^{-1}\left(F[H_O(m, n; a_x, a_y)] \times \exp\left[i\pi\lambda d'\left[\frac{u^2}{(\Delta x N_x)^2} + \frac{v^2}{(\Delta y N_y)^2}\right]\right]\right)$$

where F denotes the fast Fourier transformation and u and v are discrete spatial frequencies.

To perform recognition of, or discrimination between, three-dimensional objects, patterns or sets of data, a Fourier-matched filter approach is applied to the information obtained by digital holography. Consider a three-dimensional input object 132 whose complex amplitude distribution is given by $U_P(x, y, z)$. The input object 132 may comprise an optical image, a digitized image, a one dimensional set of data, a two dimensional set of data, a multi-dimensional set of data, an electrical signal or an optical signal and is shown as a three-dimensional object by way of exemplification. The input object 132 is also located at a distance d from the CCD 128, and has a real term in a corresponding Fresnel hologram 210, of $H_P(x, y)$. Correlation between different views of the input object 132 and a given view of the reference object 130, i.e., object recognition, can be performed by defining a window, $H_P'(x, y; a_x', a_y')$, within the Fresnel hologram, $H_P(x, y)$, of the input object 132 by the use of Eq. (5), followed by reconstructing the input object 132 with Eq. (4) (yielding the reconstructed input object $U_P'(x, y, z)$) and computing the correlation between $U_P'(x, y, z)$ and $U_O'(x, y, z)$. Alternatively, by use of Eq. (6), we can write the correlation intensity of the reference amplitude, $U_O'(x, y; a_x, a_y)$, with that of the input, $U_P'(x, y; a_x', a_y')$, generated from the holograms:

$$C_{OP}(x, y; a_x, a_y; a_x', a_y') = |F^{-1}\{F[U_O'(x, y; a_x; a_y)] \times \tag{7}$$
$$(F*[U_P'(x, y; a_x', a_y')]\}|)^2$$
$$= F^{-1}\{F[H_O'(x, y; a_x, a_y)] \times$$
$$(F*[H_P'(x, y; a_x', a_y')]\}|)^2$$

Thus, by performing the correlation between different regions or windows defined within the hologram of the reference object 130 and the hologram of the input object 132, properly modified by a linear phase factor, an evaluation of the correlation between different perspectives, views or segments of the reference object 130 and input object 132 is performed. It will be appreciated that rough objects involve fast fluctuations of the reconstructed phase during translations, thus reducing the shift invariance. Nevertheless, high sensitivity is obtained for small object motion. This is illustrated by measuring a small rotation of a rough three-dimensional object.

A three-dimensional object recognition experiment was performed with two reproductions of cars with an approximate size of 25 mm×45 mm. The objects were located at an approximate distance, d, of about 865 mm from the output plane 210. The pictures in FIGS. 3A and 3B were obtained by recording a digital hologram of each car, denoted $H_O(x, y)$ and $H_P(x, y)$. Reconstruction was performed by computing Eq. (4) with a fast Fourier-transform method applied to both of the holograms.

Figure 3A:
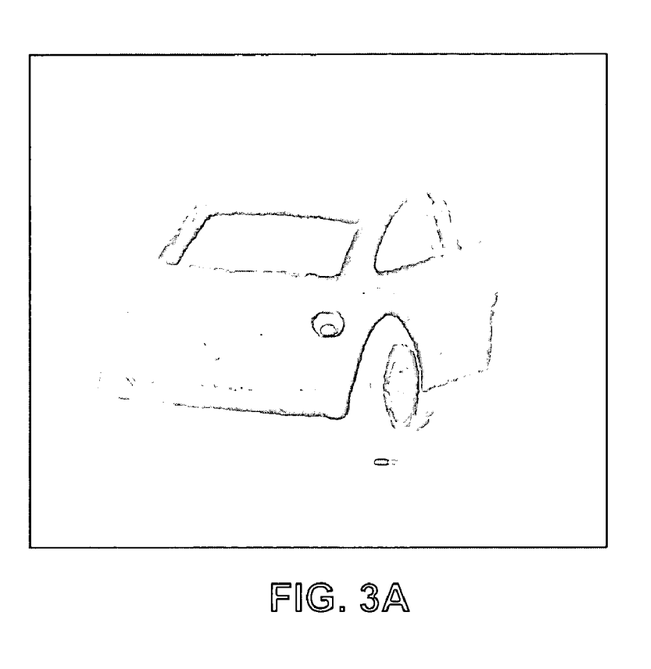
FIG. 3A is a first reconstruction of a three dimensional object from a digital hologram in a plane orthogonal to a detector.
Figure 3B:
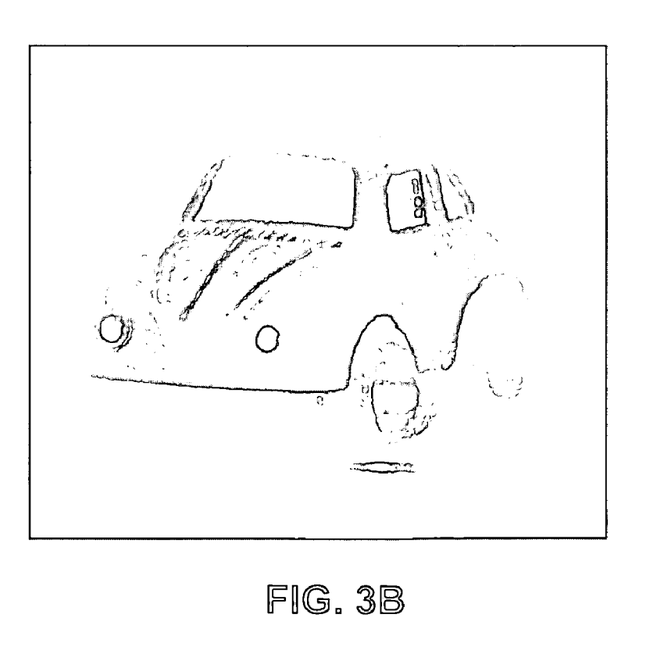
FIG. 3B is a second reconstruction of a three dimensional object from a digital hologram in a plane orthogonal to a detector.
Figure 4A:
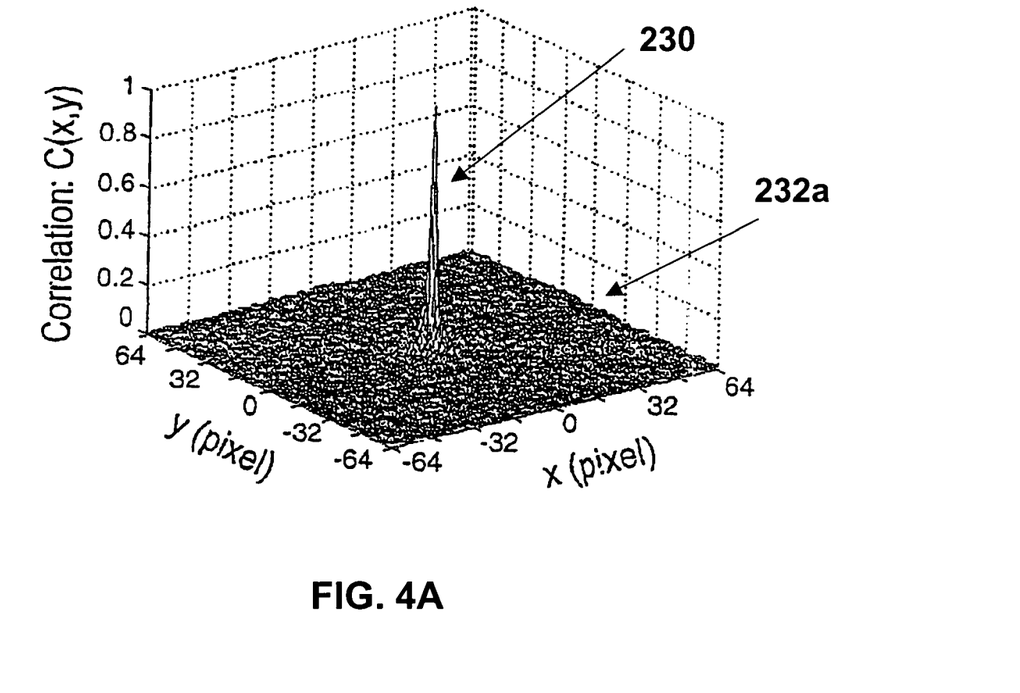
FIG. 4A is the autocorrelation by digital holography of the reconstructed three dimensional object represented in FIG. 3A.
Figure 4B:
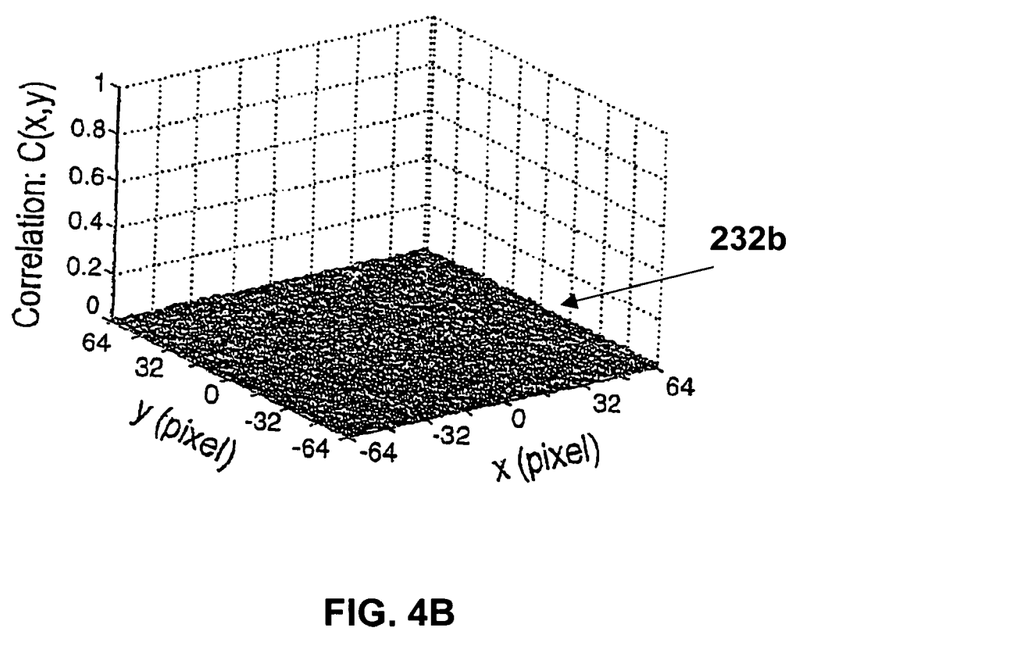
FIG. 4B is the cross correlation by digital holography of the three-dimensional objects represented in FIGS. 3A and 3B.
Figure 5A:
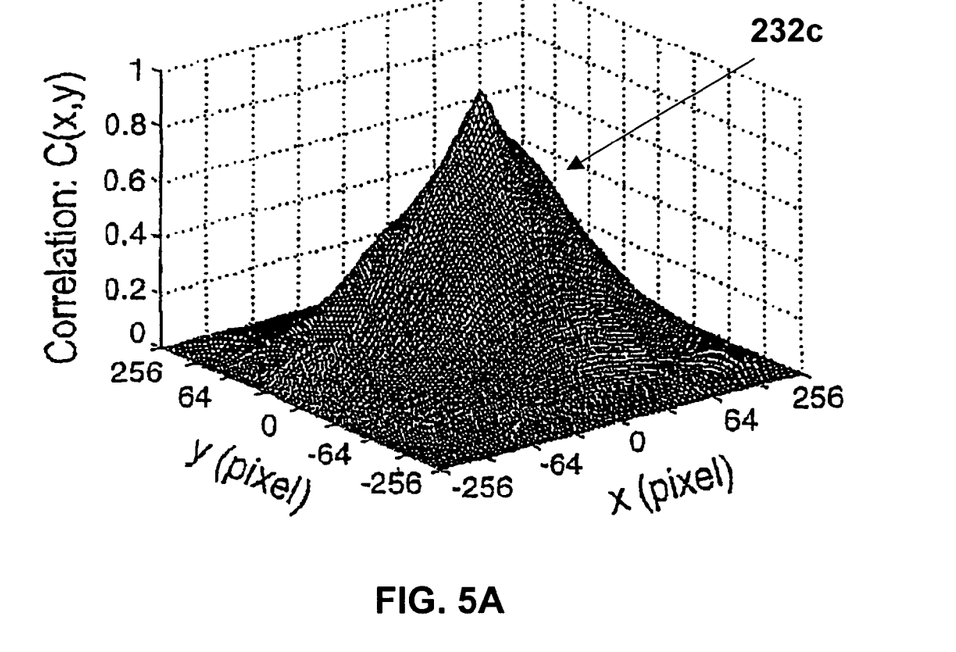
FIG. 5A is a conventional two-dimensional autocorrelation of the image of the two dimensional object in FIG. 3A.
Figure 5B:
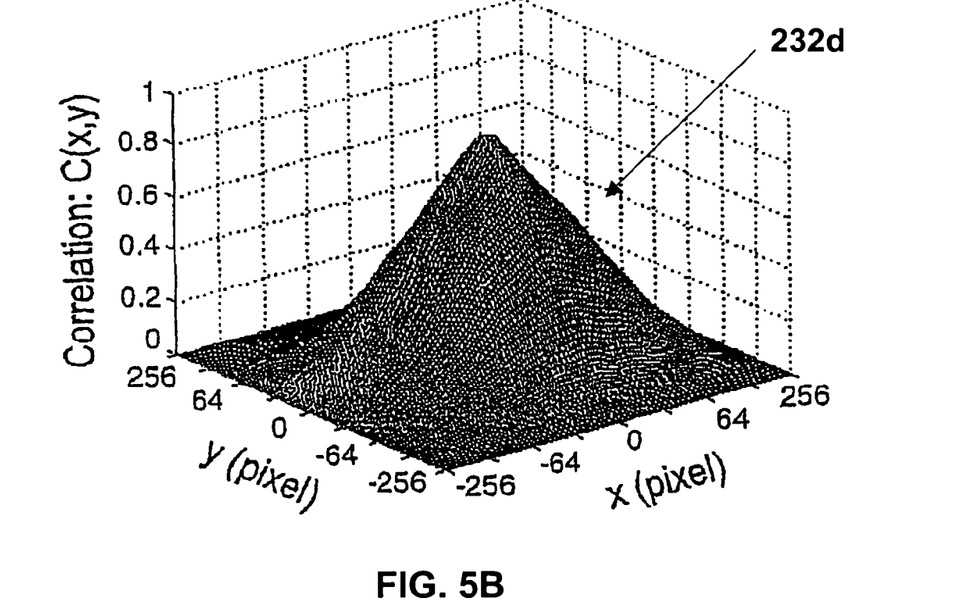
FIG. 5B is a conventional two-dimensional cross correlation of the images of the two-dimensional objects in FIGS. 3A and 3B.

FIG. 4A shows a correlation peak 230 in a plot 232a of the autocorrelation of the reconstructed object shown in FIG. 3A, which was performed by use of a digital hologram, $H_O'(x, y; 0, 0)$, obtained by placement of a window with size $b_x = b_y = 256$ pixels centered at the origin of $H_O(x, y)$ (see Eq. (5)). FIG. 4B shows a plot 232b of the cross correlation of the three-dimensional object in FIG. 3A with that in FIG. 3B, which was also obtained by digital holography. No correlation peak is seen in FIG. 4B. The reference hologram is the previous digital hologram $H_O'(x, y; 0, 0)$, and the input, $H_P'(x, y; 0, 0)$, is obtained by placement of a window with the same size centered at the origin of $H_P(x, y)$. Both plots are normalized to the same value. By way of comparison, FIG. 5A shows the conventional two-dimensional autocorrelation 232c and FIG. 5B the conventional two-dimensional cross correlation 232d, using the objects in FIGS. 3A and 3B registered as two-dimensional intensity images.

Figure 9A:
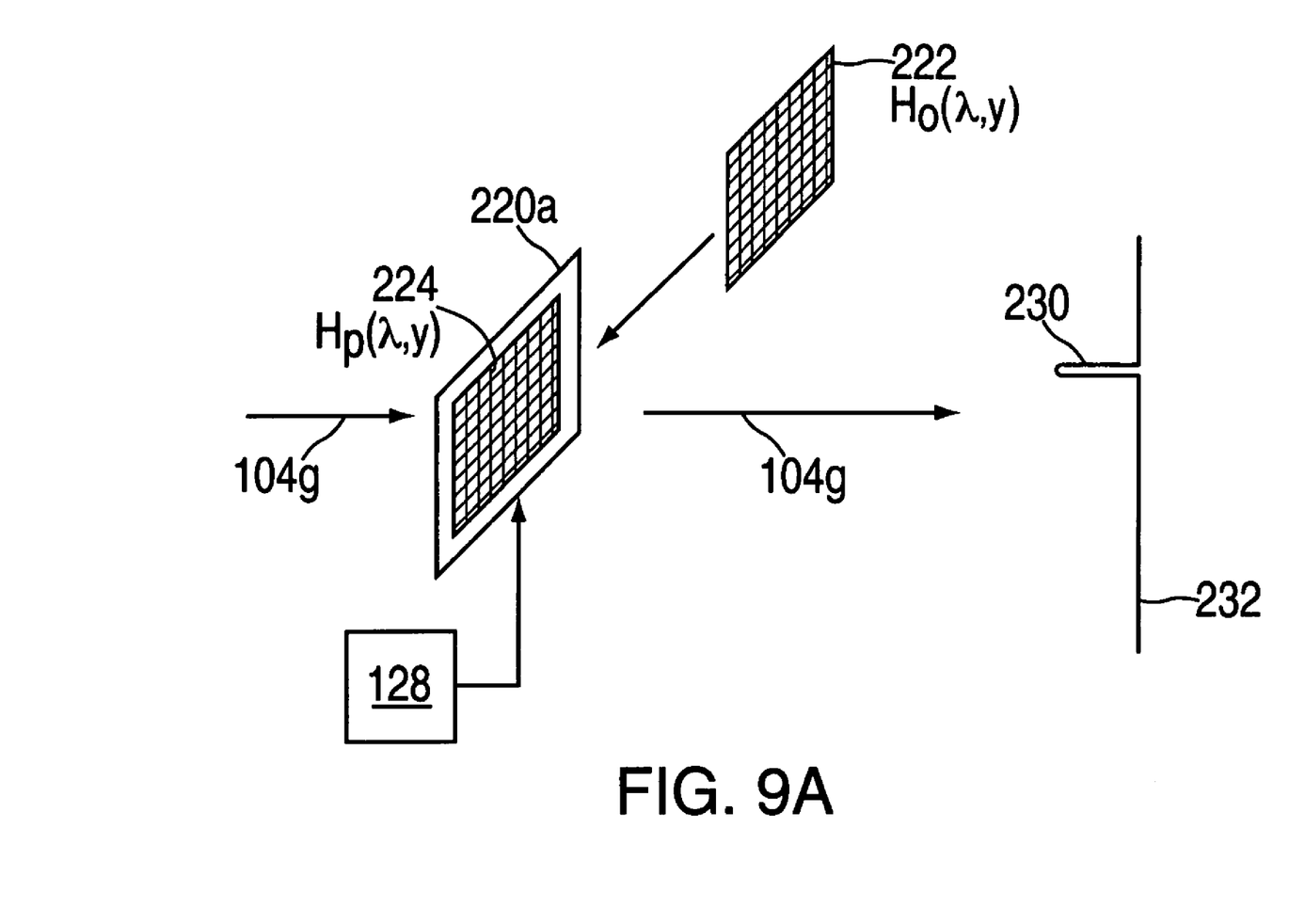
FIG. 9A is a first schematic representation of an optical correlation of a hologram of a reference object and a hologram of an input object.
Figure 9B:
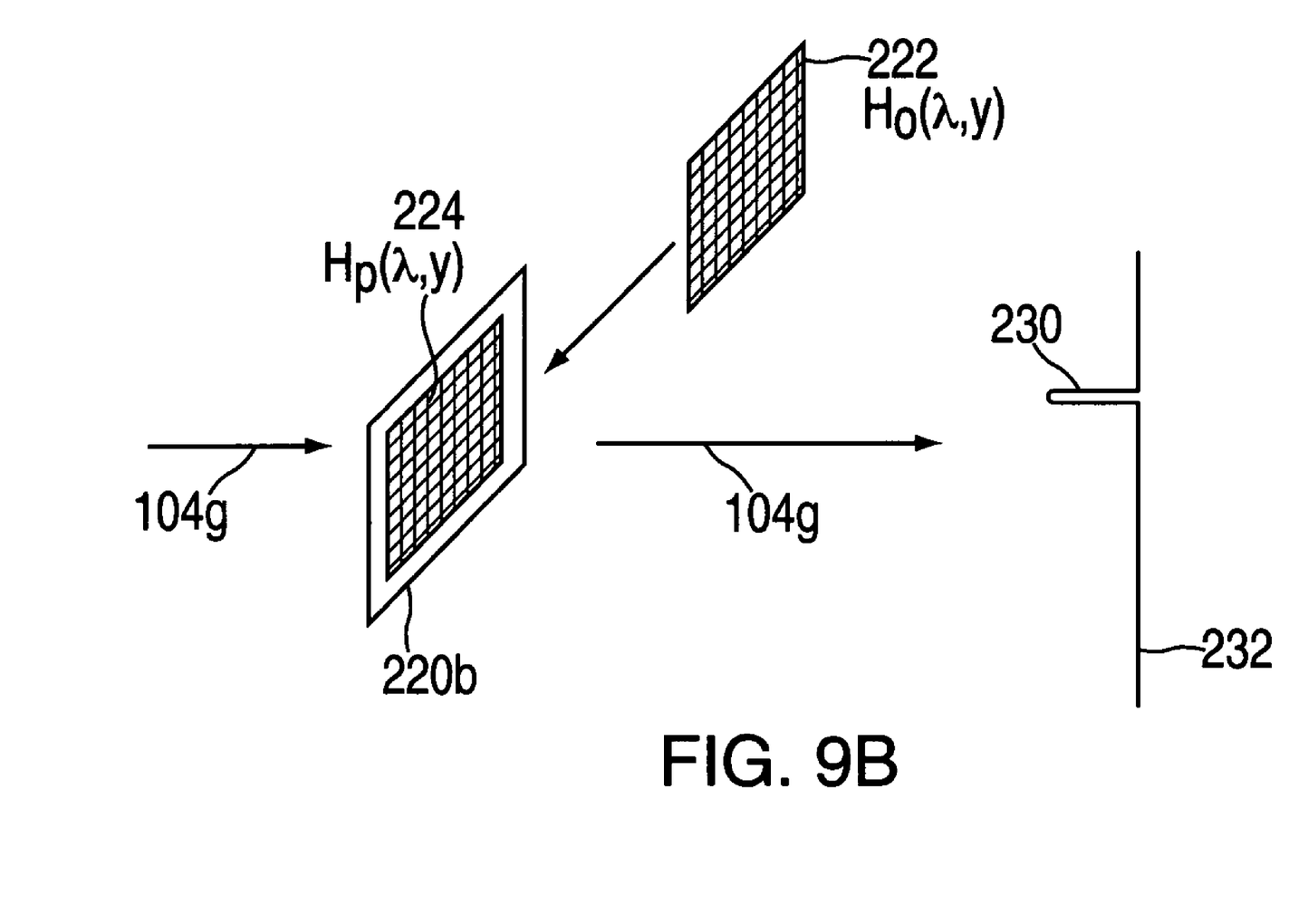
FIG. 9B is a second schematic representation of an optical correlation of a hologram of a reference object and a hologram of an input object.

In FIG. 9A the correlation of the hologram 222 of the reference object 130 with the hologram 224 of the input object 132 may be performed optically rather than digitally. An electrically addressable spatial light modulator 220a is interfaced with the detector 128. The digital holograms 222, 224 of the reference and input objects are displayed on the electrically addressable spatial light modulator 220a and the correlation of the holograms is constructed in a correlation plane by a reference wave 104g. In FIG. 9B, the holograms 222, 224 are formed by an optically addressable spatial light modulator 220b such as a liquid crystal light valve or a ferro-electric spatial light modulator. The hologram 224 of the input object 132 and the hologram 222 of the reference object 130 are read out from the output of the optically addressable spatial light modulator 220b by the reference wave 104g and the correlation of the holograms 222, 224 is formed at the correlation plane 232. The following are incorporated herein by reference: B. Javidi and J. L. Horner, "*Real-time Optical Information Processing,*" Academic Press, 1994; U.S. Pat. No. 4,832,447, entitled Joint Transform Image Correlation Using a Nonlinear Spatial Light Modulator at the Fourier Plane; U.S. Pat. No. 4. 5,841,907, entitled Spatial Integrating Optical Correlator for Verifying the Authenticity of a Person, Product or Thing; U.S. Pat. No. 5,699,449, entitled Method and Apparatus for Implementation of Neural Networks for Face Recognition; U.S. Pat. No. 5,367,579, entitled Method of Removing Spurious Responses from Optical Joint Transform Correlators; U.S. Pat. No. 5,119,443, entitled Nonlinear Joint Transform Optical Correlator Having Varying Degrees of Nonlinearity; U.S. Pat. No. 5,485,312, entitled Optical Pattern Recognition System and Method for Verifying the Authenticity of a Person, Product or Thing; B. Javidi, "*Optical Information Processing*," in Encyclopedia of Electrical and Electronic Engineering, Volume on Optics, John Wiley, 1999 and B. Javidi, "*Optical Neural Networks*," in Encyclopedia of Electrical and Electronic Engineering, Volume on Neural Networks, John Wiley, 1998 and B. Javidi and E. Tajahuerce, "*Three Dimensional Image Processing And Reconstruction*" International Symposium On Photonics For Aerospace Application Of Optics, SPIE Proceedings Vol. 4043, Orlando Fla., Apr. 24–28, 2000

Figure 6A:
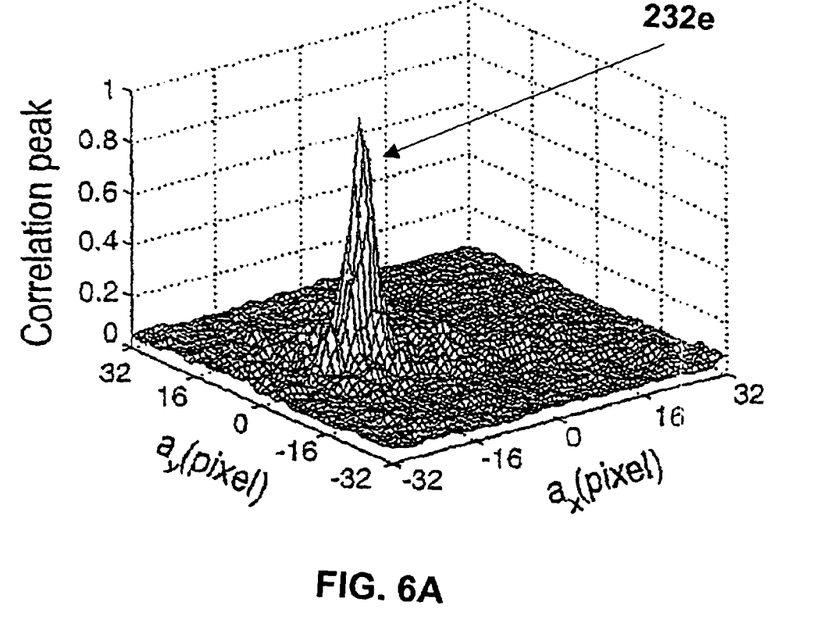
FIG. 6A is the correlation peak versus the angle of view used to measure three dimensional object orientation for the correlation of the three-dimensional object in FIG. 3A with a rotated version of the same three-dimensional object obtained by digital holography.
Figure 6B:
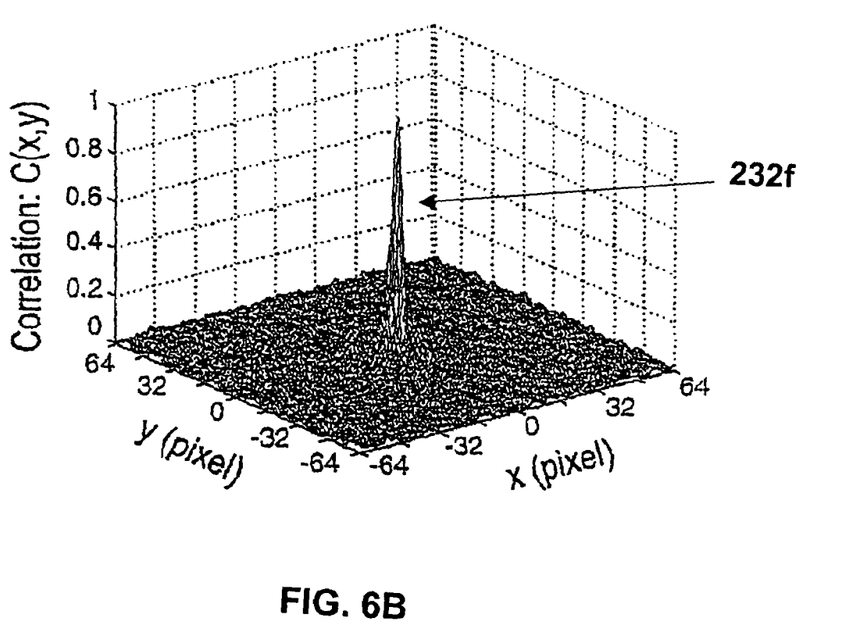
FIG. 6B is the correlation peak versus the angle of view for the correlation of the three-dimensional object of FIG. 3A with a rotated version of the same three-dimensional object giving the maximum correlation peak.

It will be appreciated that the methods disclosed herein can be used to measure changes in the kinematic properties (translation or rotation) of the three-dimensional input object 132 with respect to the reference object 130 by adjusting the parameters in the phase factor applied to the window, $H_P'(x, y; a_x', a_y')$, defined within the Fresnel hologram, $H_P(x, y)$, of the input object 132. In particular, FIG. 6 shows the correlation obtained by digital holography between the three-dimensional object in FIG. 3A, which was used as a reference, and the same slightly rotated three-dimensional object used as input. A window with a size, for example of, $b_x=b_y=256$ pixels and centered at the origin of the hologram of the reference object was utilized. The same window is shifted to different positions in the hologram of the input object. FIG. 6A shows the maximum value of the correlation 232e as a function of the displacement $(a_x, a_y)$ of the window in the hologram of the input. A peak 232e is obtained for $a_x=-12$, $a_y=-2$, corresponding to an angle of view $(\gamma, \beta)=(0.007°, 0.001°)$. FIG. 6B shows the correlation 232f for this perspective of the three-dimensional object. The sharp peak 232f indicates that the object is only rotated with respect to the axial view of the reference.

Thus a method of determining a change in a kinematic property of an object, is realized by generating a first hologram of the object, generating a second hologram of the object, correlating the first hologram with the second hologram, generating thereby a set of correlation peaks and analyzing the set correlation peaks. The aforesaid method may be accomplished by defining a window within the first hologram, defining a window within the second hologram and correlating the first and second windows, generating thereby a set of correlation peaks and analyzing the set correlation peaks. The aforesaid method may further comprise autocorrelating the first hologram and comparing the autocorrelation of the first hologram with the correlation of the first hologram with the second hologram.

Figure 7:
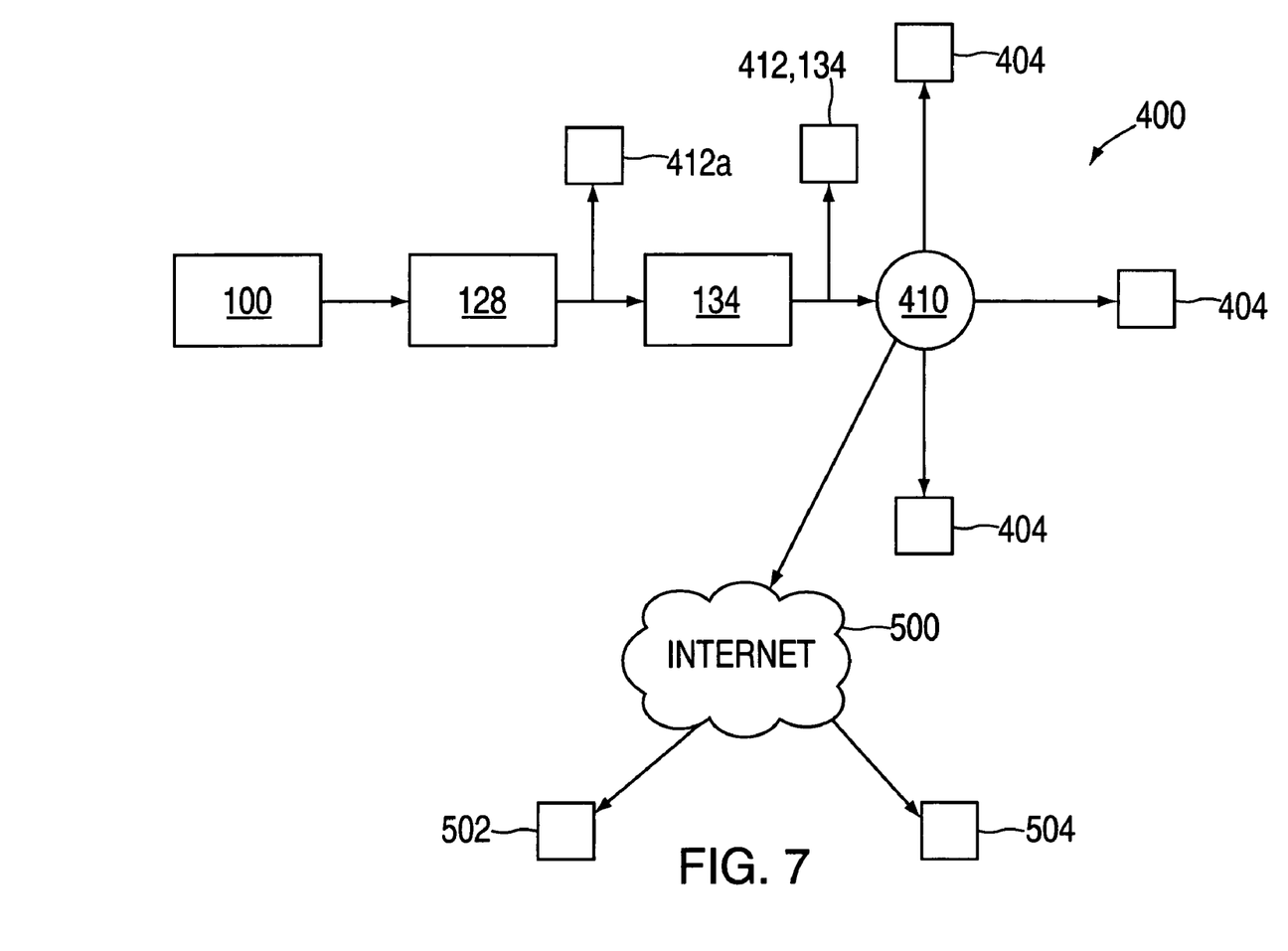
FIG. 7 is a schematic representation of a computer network connected to the phase-shifting holographic system of FIG. 1.
Figure 8A:
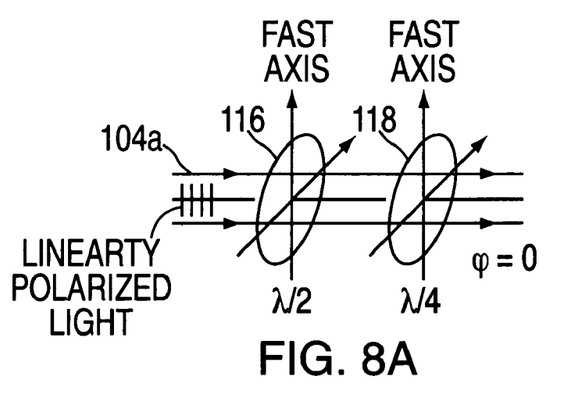
FIG. 8 is a representation of the four step method of inducing a phase shift in the reference beam of the interferometric system of FIG. 1.
Figure 8B:
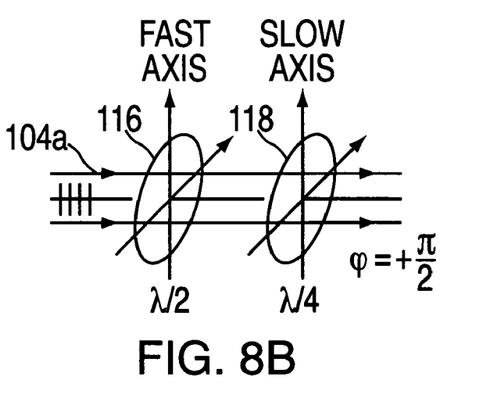
Figure 8C:
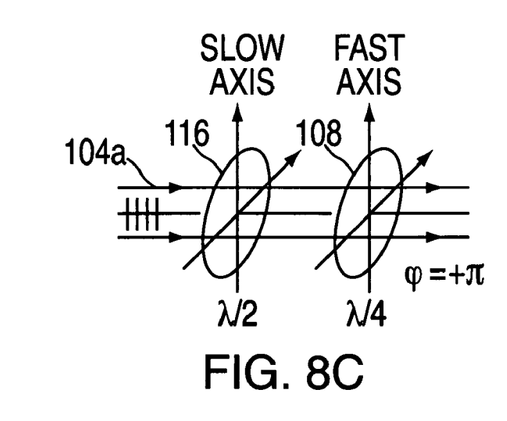
Figure 8D:
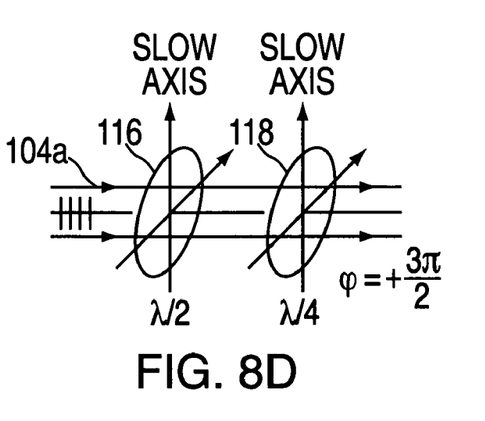

Referring to FIG. 7, the detector 128 is shown connected to a computer or communications network 400, such as a local area network (LAN) or a wide area network (WAN) via a computer 134. The detector 128 may also be connected directly to a liquid crystal display (LCD), liquid crystal television (LCTV) or an electrically or optically addressable spatial light modulator or ferroelectric spatial light modulator 412a. The computer network 400 includes a plurality of similar client personal computers 404 connected to a server 410 from remote geographical locations by wired or wireless connections, by radio based communications, by telephony based communications, or by other network-based communications. The computer 134 may also be connected directly to another like computer 134 or to a display device 412, such as a liquid crystal display (LCD), liquid crystal television (LCTV) or an electrically or optically addressable spatial light modulator (SLM) for 3D optical reconstruction of the objects 130, 132 or patterns or sets of data. The computer network 400 is in turn similarly connected to other computers 502 or networks 504 through the Internet 500. The computers 134, 404, 502, display devices 136, 412, 412a and other devices of the networks 400, 500, 504 are configured to execute program software, that allows them to send, receive, store, record and process the holograms, $H_O(x, y)$ and $H_P(x, y)$, either separately or in combination, between and amongst themselves via the networks 400, 504 or the Internet 500. Such processing includes, for example, image compression and decompression, filtering, contrast enhancement, image sharpening, noise removal and correlation for image classification. Decompressed images may be displayed on display devices such as liquid crystal displays, liquid crystal TVs or electrically or optically addressable spatial light modulators.

Based upon the foregoing description, an optoelectronic holographic method and system for performing pattern recognition of three-dimensional objects, or sets of data, by use of digital phase-shifting holography has been presented. This method is based on the ability of a digital plane hologram to reconstruct different perspectives of a three-dimensional object. The method allows one to obtain three-dimensional information on reference and the input objects. Three-dimensional pattern recognition is carried out by use of a digital matched filter technique applied to the holographic information. The holographic data can be transmitted through conventional digital communications channels to remote locations and reconstructed therefrom digitally or optically.

Utilizing phase-shifting interferometry, (J. H. Bruning, D. R. Herriott, J. E. Gallagher, D. P. Rosenfeld, A. D. White, and D. J. Brangaccio, Appl. Opt. 13, 2693 (1974) and I. Yamaguchi and T. Zhang, Opt. Lett. 22, 1268 (1997) which are incorporated herein by reference in their entirety) the methods herein electronically record the complex amplitude distribution generated by a three-dimensional object at a single plane located in the Fresnel diffraction region. Similarly, a digital hologram of a three-dimensional reference pattern is recorded to be used as a correlation filter. Thus, pattern recognition by use of three-dimensional information can be performed by application of correlation methods to digital holograms.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting the claims.

What is claimed is:

1. A method of pattern recognition comprising:
   generating a hologram of a reference abject;
   generating a hologram of an input object; and
   correlating the hologram of the reference object with the hologram of the input object to generate a set of correlation peaks;

wherein the correlating of the hologram of the reference object with the hologram of the input object comprises:
transforming the hologram of the reference object;
transforming the hologram of the input object; and
multiplying the transformation of the hologram of the reference object by the transformation of the hologram of the input object.

2. The method as set forth in claim 1 further comprising analyzing the set of correlation peaks generated by the correlation of the hologram of the reference object with the hologram of the input object wherein the presence of a correlation peak indicates similarity between the reference object and the input object and wherein the lack of the presence of a correlation peak indicates dissimilarity between the reference object and the input object.

3. The method as set forth in claim 1 further comprising recording the hologram of the reference object.

4. The method as set forth in claim 1 further comprising recording the hologram of the input object.

5. The method as set forth in claim 1 wherein the transforming of the hologram of the reference object comprises Fourier transforming the hologram of the reference object and wherein transforming the hologram of the input object comprises Fourier transforming the hologram of the input object.

6. The method as set forth in claim 5 further comprising transforming the multiplication of the transformation of the hologram of the reference object and the transformation of the hologram of the input object.

7. A method of pattern recognition comprising:
generating a hologram of a reference object;
generating a hologram of an input object;
defining a window within the hologram of the input object;
correlating the hologram of the reference object with the window defined within the hologram of the input object to generate a set of correlation peaks;
wherein the correlating of the hologram of the reference object with the window within the hologram of the input object comprises:
transforming the hologram of the reference object;
transforming the window defined within the hologram of the input object; and
multiplying the transformation of the hologram of the reference object by the transformation of the window defined within the hologram of the input object.

8. The method as set forth in claim 7 further comprising analyzing the set of correlation peaks generated by the correlation of the hologram of the reference object with the window defined within the hologram of the input object wherein the presence of a correlation peak indicates similarity between the reference object and the input object and wherein the lack of the presence of a correlation peak indicates dissimilarity between the reference object and the input object.

9. The method as set forth in claim 7 further comprising recording the hologram of the reference object.

10. The method as set forth in claim 7 further comprising recording the hologram of the input object.

11. The method as set forth in claim 7 wherein the transforming of the hologram of the reference object comprises Fourier transforming the hologram of the reference object and wherein transforming the window within the hologram of the input object comprises Fourier transforming the window within the hologram of the input object.

12. The method as set forth in claim 11 further comprising transforming the multiplication of the transformation of the hologram of the reference object and the transformation of the window defined within the hologram of the input object.

13. A method of pattern recognition comprising:
generating a hologram of a reference object;
generating a hologram of an input object;
defining a window within the hologram of the input object;
correlating the hologram of the reference object with the window defined within the hologram of the input object to generate a set of correlation peaks;
wherein the defining of a window within the hologram of the input object comprises defining a window according to the equation $$H'_p(m, n; a_x, a_y) = H_p(m, n) rect\left(\frac{m - a_x}{b_x}, \frac{n - a_y}{b_y}\right),$$

wherein $H_p'(m,n;a_x,a_y)$ is the defined window, $$rect\left(\frac{m - a_x}{b_x}, \frac{n - a_y}{b_y}\right)$$

is the rectangle function, $H_p(m,n)$ is the hologram of the reference object, $a_x$ is the location of the center of the window in x direction, $a_y$ is the location of the center of the window in the y direction, $b_x$ is width of the window in the x direction, and $b_y$ is width in the y direction.

14. A computer readable medium having computer-executable instructions for performing the following:
generating a hologram of a reference object;
generating a hologram of an input object; and
correlating the hologram of the reference object with the hologram of the input object to generate a set of correlation peaks;
wherein the correlating of the hologram of the reference object with the hologram of the input object comprises:
transforming the hologram of the reference object;
transforming the hologram of the input object; and
multiplying the transformation of the hologram of the reference object by the transformation of the hologram of the input object.

15. The computer readable medium as set forth in claim 14 further comprising analyzing the set of correlation peaks generated by the correlation of the hologram of the reference object with the hologram of the input object wherein the presence of a correlation peak indicates similarity between the reference object and the input object and wherein the lack of the presence of a correlation peak indicates dissimilarity between the reference object and the input object.

16. The computer readable medium as set forth in claim 14 wherein the generating of the hologram of the reference object includes recording the hologram of the reference object.

17. The computer readable medium as set forth in claim 14 wherein the generating of the hologram of the input object includes recording the hologram of the input object.

18. The computer readable medium as set forth in claim 14 wherein the transforming of the hologram of the reference object comprises Fourier transforming the kilogram of the reference object.

19. The computer readable medium as set forth in claim 14 wherein the transforming of the hologram of the input object comprises Fourier transforming the hologram of the input object.

20. A computer readable medium having computer-executable instructions for performing the following:
   generating a hologram of a reference object;
   generating a hologram of an input object;
   defining a window within the hologram of the input object;
   correlating the hologram of the reference object with the window within the hologram of the input object to generate a set of correlation peaks;
   wherein the defining of a window within the hologram of the input object comprises defining window according to the equation $$H'_p(m, n; a_x, a_y) = H_p(m, n) rect\left(\frac{m - a_x}{b_x}, \frac{n - a_y}{b_y}\right),$$

wherein $H_p'(m, n; a_x, a_y)$ is the defined window;

$$rect\left(\frac{m - a_x}{b_x}, \frac{n - a_y}{b_y}\right)$$

is the rectangle function, $H_p(m,n)$ is the hologram of the reference object, $a_x$ is the location of the center of the window in the x direction, $a_y$ is the location of the center of the window in they direction, $b_x$ is width of the window in the x direction, $b_y$ is width of the windowing in the y direction.

21. The computer readable medium as set forth in claim 20 further comprising analyzing the set of correlation peaks generated by the correlation of the hologram of the reference object with the hologram of the input object wherein the presence of a correlation peak indicates similarity between the reference object and the input object and wherein the lack of the presence of a correlation peak indicates dissimilarity between the reference object and the input object.

22. The computer readable medium as set forth in claim 20 wherein the generating of the hologram of the reference object includes recording the hologram of the reference object.

23. The computer readable medium as set forth in claim 20 wherein the generating of the hologram of the input object includes recording the hologram of the input object.

24. A computer readable medium having computer-executable instructions for performing the following:
   generating a hologram of a reference object;
   generating a hologram of an input object;
   defining a window within the hologram of the input object;
   correlating the hologram of the reference object with the window within the hologram of the input object to generate a set of correlation peaks;
   wherein the correlating of the hologram of the reference object with to window within the hologram of the input object comprises:
   transforming the hologram of the reference object;
   transforming the window within the hologram of the input object; and
   multiplying the transformation of the hologram of the reference object by the transformation of the window within the hologram of the input object.

25. The computer readable medium as set forth in claim 24 wherein the transforming of the hologram of the reference object comprises Fourier transforming the hologram of the reference object.

26. The computer readable medium as set forth in claim 24 wherein the transforming of the window within the hologram of the input object comprises Fourier transforming the window within the hologram of the input object.

27. The method as set forth in claim 6 further comprising taking the absolute value of the transformation of the multiplication of the transformation of the hologram of the reference object by the transformation of the hologram of the input object.

28. The method as set forth in claim 27 further comprising squaring the absolute value of the transformation of the multiplication of the transformation of the hologram of the reference object by the transformation of the hologram of the input object according to the equation $$C_{OP}(x,y;a_x,a_y;a_x',a_y')=|F^{-1}\{F[H_O'(x,y;a_x, a_y)]\times F^*[H_P'(x,y;a_x',a_y')]\}|^2$$

wherein $C_{OP}(x,y;a_x,a_y;a_x',a_y')$ is the intensity of the correlation of the hologram of the reference object with the hologram of the input object, $H_O'(x,y;a_x,a_y)$ is the hologram of the reference object, $H_P'(x,y\ a_x',a_y')$ is the window defined within the hologram of the input object, F indicates a transformation, $F^1$ indicates an inverse transformation and $F^*$ indicates a complex transformation.

29. The method as set forth in claim 12 further comprising taking the absolute value of the transformation of the multiplication of the transformation of the hologram of the reference object by the transformation of the hologram of the input object.

30. The method as set forth in claim 29 further comprising squaring the absolute value of the transformation of the multiplication of the transformation of the hologram of the reference object by the transformation of the hologram of the input object according to the equation $$C_{OP}(x,y;a_x,a_y;a_x',a_y')=|F^{-1}\{F[H_O'(x,y;a_x, a_y)]\times F^*[H_P'(x,y;a_x',a_y')]\}|^2$$

wherein $C_{OP}(x,y;a_x,a_y;a_x',a_y')$ is the intensity of the correlation of the hologram of the reference object with the hologram of the input object, $H_O'(x,y;a_x,a_y)$ is the hologram of the reference object, $H_P'(x,y;a_x',a_y')$ is the window defined within the hologram of the input object F indicates a transformation, $F^1$ indicates an inverse transformation and $F^*$ indicates a complex transformation.

31. The method as set forth in claim 28 wherein F indicates a Fourier transformation.

32. The method as set forth in claim 30 wherein F indicates a Fourier transformation.

33. The method as set forth in claim 3 wherein the recording of the hologram of the reference object includes digitally recording the hologram of the reference object.

34. The method as set forth in claim 33 wherein the digitally recording of the hologram of the reference object comprises storing the hologram of the reference object in a computer readable storage medium.

35. The method as set forth in claim 4 wherein the recording of the hologram of the input object includes digitally recording the hologram of the input object.

36. The method as set forth in claim 35 wherein the digitally recording of the hologram of the input object comprises storing the hologram of the input object in a computer readable storage medium.

37. The method as set forth in claim 9 wherein the recording of the hologram of the reference object includes digitally recording the hologram of the reference object.

38. The method as set forth in claim 37 wherein the digitally recording of the hologram of the reference object includes storing the hologram of the reference object in a computer readable storage medium.

39. The method as set forth in claim 10 wherein the recording of the hologram of the input object includes digitally recording the hologram of the input object.

40. The method as set forth in claim 39 wherein the digitally recording of the hologram of the input object includes storing the hologram of the input object in a computer readable storage medium.

41. The method as set forth in claim 13 further comprising applying a phase factor, $\exp[i2\pi(a_x m + a_y n)]$, to the window defined within the hologram of the input object.

42. A method of determining a change in a kinematic property of an object, the method comprising:
generating a first hologram of the object;
generating a second hologram of the object; and
correlating the first hologram with the second hologram, to generate a
set of correlation peaks;
further comprising autocorrelating the first hologram and comparing the autocorrelation of the first hologram with the correlation of the first hologram with the second hologram.

43. The method as set forth in claim 42 further comprising analyzing the set of correlation peaks wherein the presence of a correlation peak indicates a change in a kinematic property of the object and wherein the lack of the presence of a correlation peak indicates no change in the change in a kinematic property of the object.

44. The method as set forth in claim 1 wherein the reference object comprises an optical image, a digitized image, a one dimensional set of data, a two dimensional set of data, a multi-dimensional set of data, an electrical signal, an optical signal, a two-dimensional phase object, a multi-dimensional phase object or a color object.

45. The method as set forth in claim 1 wherein the input object comprises an optical image, a digitized image, a one dimensional set of data, a two dimensional set of data, a multi-dimensional set of data, an electrical signal, an optical signal, a two-dimensional phase object, a multi-dimensional phase object or a color object.

46. The method as set forth in claim 1 further comprising conveying the hologram of the reference object to a remote location over a distributed computer network.

47. The method as set forth in claim 1 further comprising conveying the hologram of the input object to a remote location over a distributed computer network.

48. The method as set forth in claim 1 further comprising conveying the correlation of the hologram of the reference object with the hologram of the input object to a remote location over a distributed computer network.

49. The method as set forth in claim 7 further comprising conveying the hologram of the input object to a remote location over a distributed computer network.

50. The method as set forth in claim 7 further comprising conveying the hologram of the reference object to a remote location over a distributed computer network.

51. The storage medium as set forth in claim 7 further comprising conveying the correlation of the hologram of the reference object with the window defined within the hologram of the input object to a remote location over a distributed computer network.

52. The computer readable medium as set forth in claim 20 further comprising conveying the hologram of the input object to a remote location over a distributed computer network.

53. The computer readable medium as set forth in claim 20 further comprising conveying the hologram of the reference object to a remote location over a distributed computer network.

54. The computer readable medium as set forth in claim 20 further comprising conveying the correlation of the hologram of the reference object with the window within the hologram of the input object to a remote location over a distributed computer network.

55. The method as set forth in claim 1 further comprising processing the hologram of the reference object by image compression of the hologram.

56. The method as set forth in claim 55 further comprising conveying the compressed hologram to remote locations over a distributed computer network.

57. The method as set forth in claim 1 further comprising processing the hologram of the input object by image compression of the hologram.

58. The method as set forth in claim 57 further comprising conveying the compressed hologram to remote locations over a distributed computer network.

59. The method as set forth in claim 55 further comprising processing the compressed hologram of the reference object by image decompression of the hologram.

60. The method as set forth in claim 57 further comprising processing the compressed hologram of the input object by image decompression of the hologram.

61. The method as set forth in claim 7 wherein the reference object comprises an optical image, a digitized image, a one dimensional set of data, a two dimensional set of data, a multi-dimensional set of data, an electrical signal, an optical signal, a two-dimensional phase object, a multi-dimensional phase object or a color object.

62. The method as set forth in claim 7 wherein the input object comprises an optical image, a digitized image, a one dimensional set of data, a two dimensional set of data, a multi-dimensional set of data, an electrical signal, an optical signal, a two-dimensional phase object, a multi-dimensional phase object or a color object.

63. The method as set forth in claim 42 wherein the reference object comprises an optical image, a digitized image, a one dimensional set of data, a two dimensional set of data, a multi-dimensional set of data, an electrical signal, an optical signal, a two-dimensional phase object, a multi-dimensional phase object or a color object.

64. The method as set forth in claim 42 wherein the input object comprises an optical image, a digitized image, a one dimensional set of data, a two dimensional set of data, a multi-dimensional set of data, an electrical signal, an optical signal, a two-dimensional phase object, a multi-dimensional phase object or a color object.

65. A method of pattern recognition comprising:
generating a hologram of a reference object;
generating a hologram of an input object; and
correlating the hologram of the reference object with the hologram of the input object to generate a set of correlation peaks;
wherein correlating the hologram of the reference abject with the hologram of the input object comprises:
displaying the holograms of the input object and the reference object on electrically or optically addressable spatial light modulators;

addressing the electrically or optically addressable spatial light modulators with a reference beam; and processing the holograms optically to generate a set of correlation peaks.

66. A method of pattern recognition comprising:

generating a hologram of a reference object;

generating a hologram of an input object;

defining a window within the hologram of the input object;

correlating the hologram of the reference object with the window defined within the hologram of the input object to generate a set of correlation peaks;

wherein correlating to hologram of the reference object with the window defined within the hologram of the input object comprises:

displaying the window defined within the hologram of the input object and the hologram of the reference object on electrically or optically addressable spatial light modulators;

addressing the electrically addressable spatial light modulator with a reference beam; and processing the holograms optically to generate a set of correlation peaks.

67. A method of pattern recognition comprising:

generating a hologram of a reference object;

generating a hologram of an input object; and correlating the hologram of the reference object with the hologram of the input object to generate a set of correlation peaks;

wherein correlating the hologram of the reference object with the hologram of the input object comprises:

forming the holograms of the input object and the reference object on electrically or optically addressable spatial light modulators;

addressing the optically addressable spatial light modulator with a reference beam; and processing the holograms optically to generate a set of correlation peaks.

68. A method of pattern recognition comprising:

generating a hologram of a reference object;

generating a hologram of an input object;

defining a window within the hologram of the input object;

correlating the hologram of the reference object with the window defined within the hologram of the input object to generate a set of correlation peaks;

wherein correlating the hologram of the reference object with the window defined within the hologram of the input object comprises:

forming the window defined within the hologram of the input object and the hologram of the reference object on electrically or optically addressable spatial light modulators;

addressing the electrically or optically addressable spatial light modulators with a reference beam; and processing the holograms optically to generate a set of correlation peaks.

* * * * *